(No Model.) 3 Sheets—Sheet 1.
T. GRAY.
DIAGRAM ATTACHMENT FOR TESTING MACHINES.
No. 548,361. Patented Oct. 22, 1895.
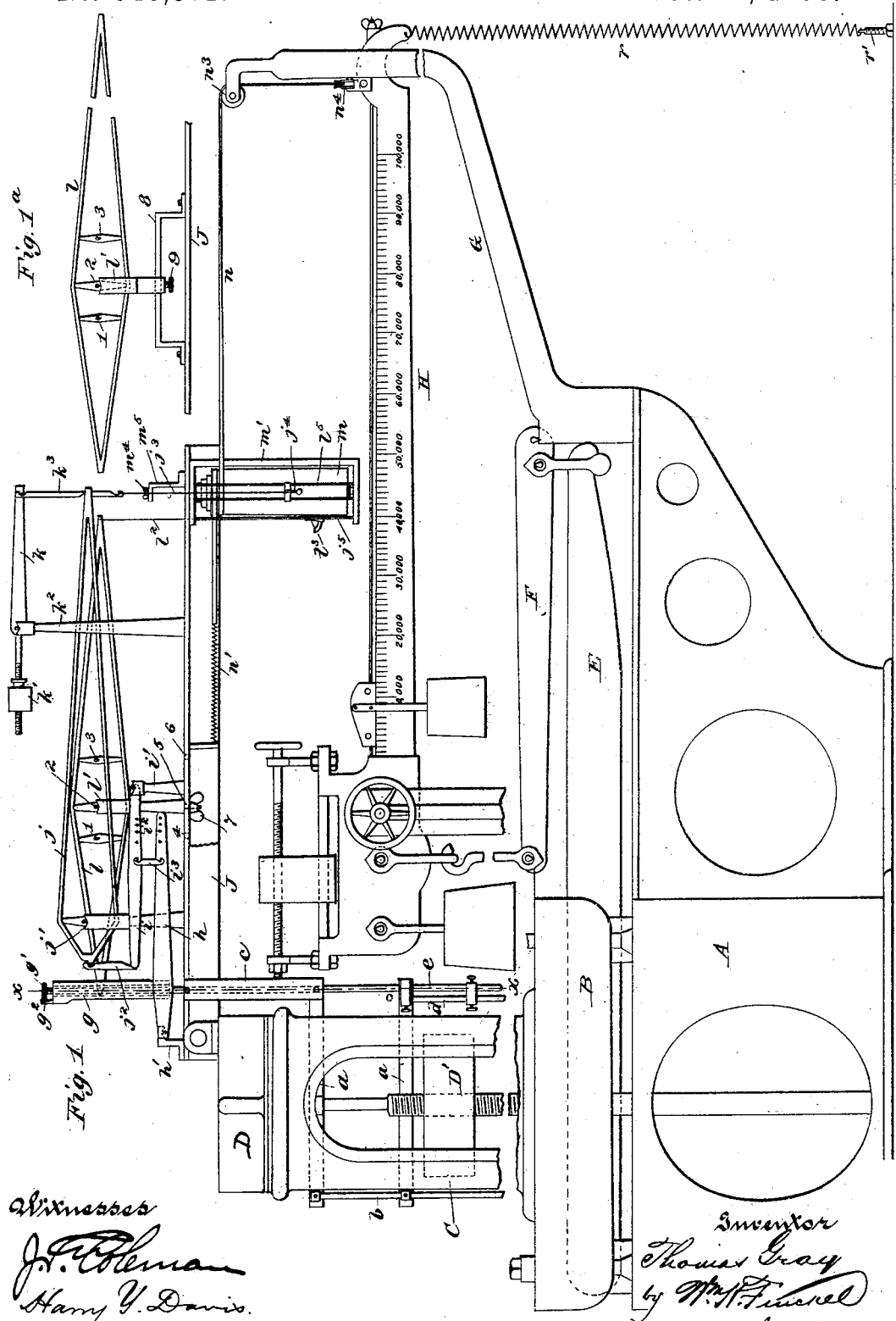

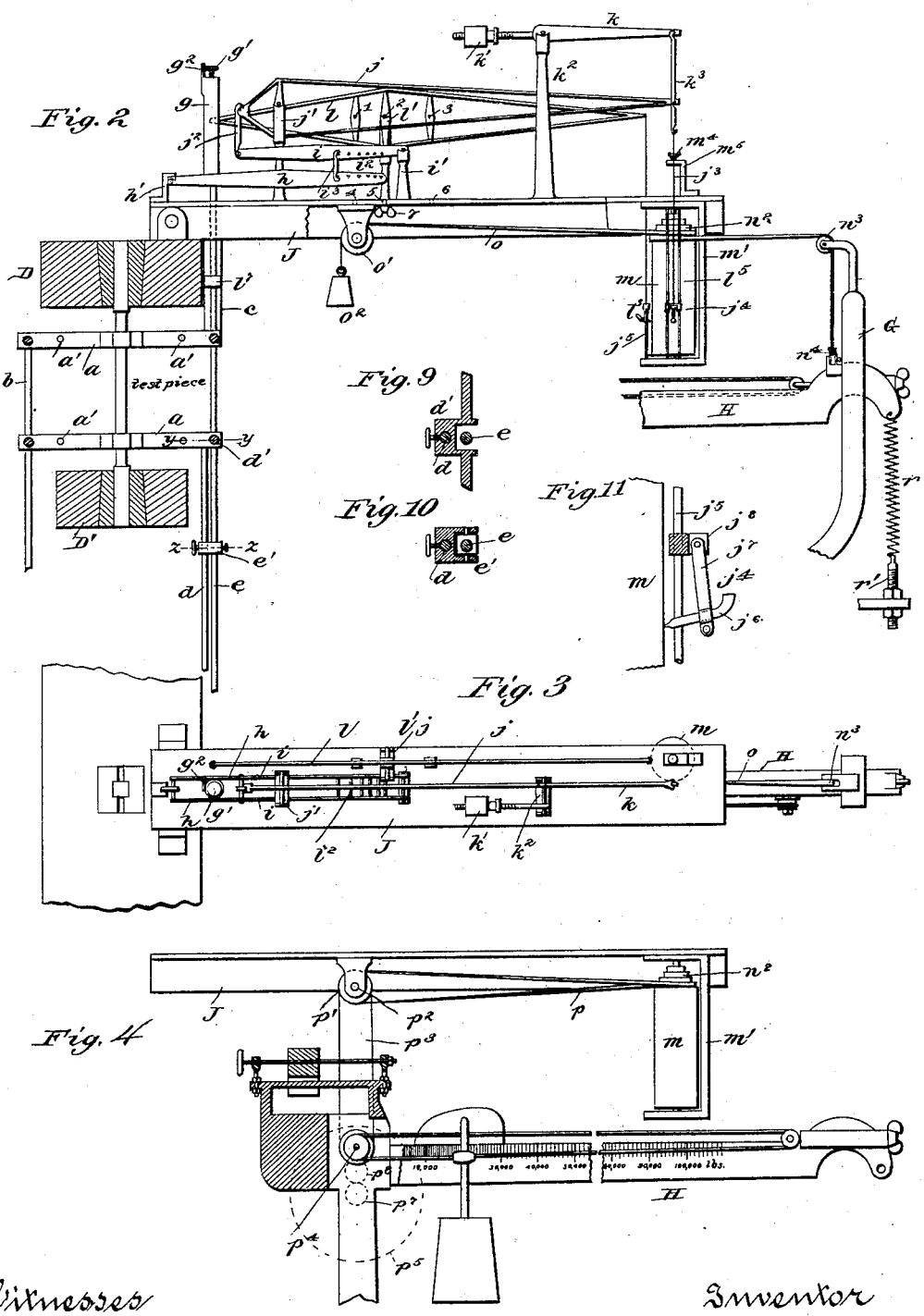

(No Model.) 3 Sheets—Sheet 3.
T. GRAY.
DIAGRAM ATTACHMENT FOR TESTING MACHINES.
No. 548,361. Patented Oct. 22, 1895.
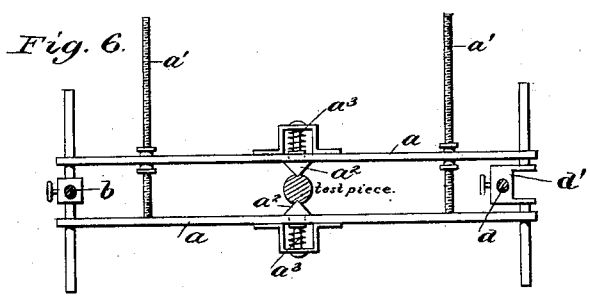
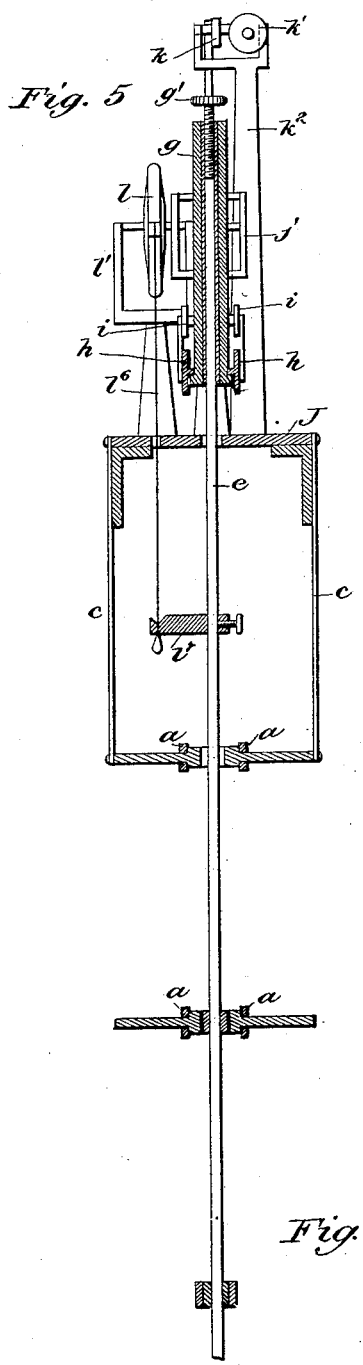
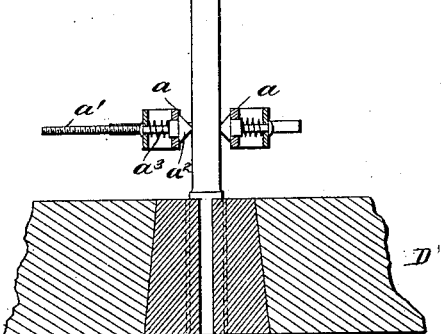
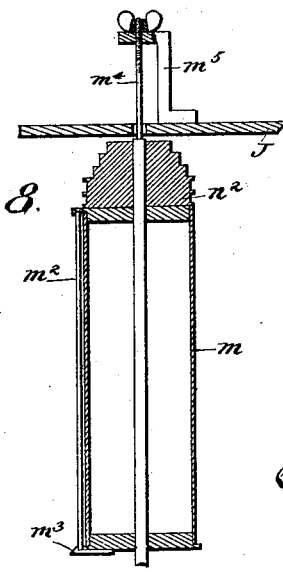
Witnesses. Inventor
Thomas Gray
his Atty.

UNITED STATES PATENT OFFICE.

THOMAS GRAY, OF TERRE HAUTE, INDIANA, ASSIGNOR TO FREDERICK A. RIEHLÈ, OF PHILADELPHIA, PENNSYLVANIA.

DIAGRAM ATTACHMENT FOR TESTING-MACHINES.

SPECIFICATION forming part of Letters Patent No. 548,361, dated October 22, 1895.

Application filed March 27, 1893. Serial No. 467,873. (No model.)

*To all whom it may concern:*

Be it known that I, THOMAS GRAY, a subject of the Queen of Great Britain, residing at Terre Haute, in the county of Vigo, in the State of Indiana, have invented a certain new and useful Improvement in Diagram Attachments for Testing-Machines, of which the following is a full, clear, and exact description.

This invention relates to an attachment for testing-machines which are used for ascertaining the strength of metals and other materials.

The object of the invention is to give a double-strain diagram of the test as it proceeds, one diagram showing, enlarged, the stress and strain within the elastic limit of the specimen of test-piece and the other giving the full curve of the test.

The invention will be described first and then particularly claimed.

In the accompanying drawings, illustrating my invention, in the several figures of which like parts are similarly designated, Figure 1 is a side elevation showing my invention applied to a well-known form of testing-machine manufactured by the Riehlè Bros. Testing Machine Company, of Philadelphia, Pennsylvania, the testing-machine being broken out horizontally in order to bring the illustration within the "sight" of the sheet of drawing-board. Fig. 1$^a$ is a side elevation of a modified form of changeable fulcrum for the full-test curve-lever. Fig. 2 is a side elevation of my attachment, showing the cross-heads for the test-piece in section, and also showing a weight instead of a spring connected with the drum for its rotation. Fig. 3 is a plan view of the parts shown in Fig. 2. Fig. 4 is a sectional elevation showing the drum connected with the poise of the testing-machine scale-beam. Fig. 5 is a sectional elevation taken substantially in the plane of line $x$ $x$, Fig. 1, and looking toward the right. Fig. 6 is a plan of one form of clamps by which the levers of my diagram apparatus are connected with the test-piece. Fig. 7 is a sectional elevation, on a larger scale, showing the test-piece arranged in the cross-heads and the clamps for connection with the levers of my diagram apparatus applied to such test-piece. Fig. 8 is a vertical section of the drum. Fig. 9 is a horizontal section at $y$ $y$, Fig. 2; and Fig. 10 is a horizontal section at $z$ $z$, Fig. 2. Fig. 11 is a sectional elevation, on a larger scale, showing the pen-piece in detail.

The frame A, bed B, head or column C, the upper cross-head D, and the lower movable cross-head D', the levers E and F, beam-stand G, and scale-beam H may be as usual, and the movable cross-head may be moved by any suitable power arrangement. (Not shown.)

Two clamps are employed for use on the test-piece to transmit its action under strain to the diagram apparatus and are hereinafter designated the "upper" and "lower" clamps. Each of these clamps is composed of parallel bars $a$, connected together by screws $a'$, whereby they may be adjusted with respect to the test-piece. The bars $a$ are provided with the opposite points $a^2$, (preferably of hardened steel,) which are adapted to enter punch marks or notches in the test-piece, and these points are provided with springs $a^3$, whereby the points automatically follow the test-piece in its diminutions under strain. The upper and lower clamps are pivotally connected with the bar or rod $b$ and the upper clamp is hung in a stirrup $c$, which is suspended from some fixed point—as, for example, the head of the machine or the platform J. (See Fig. 5.) The lower clamp is connected with a rod $d$ through a coupling $d'$, and this rod $d$ is connected with another rod $e$ by a coupling $e'$ at a point distant from the coupling $d'$ equal to the distance between the clamps on the rod $b$, so that the rods $d$ and $e$ move with the lower clamp and so that the rods $b$ and $e$ have a parallel motion. The rod $e$ extends upwardly into and supports a hollow post $g$, which supports by knife-edges part of the weight of the lever $h$, (see Fig. 5,) and the extent of projection of the rod $e$ into said post is governed by a set-screw $g'$ in the head of the post. This set-screw has a graduated rim, which works in conjunction with a graduated arm $g^2$ on the post.

Instead of a rod $e$ a tape or other connector may be used, in which case the lower end of the post $g$ rests on the knife-edges of the lever $h$.

J is a platform suitably supported upon or in conjunction with the testing-machine. A lever $h$ is mounted in a fulcrum-stand $h'$ on the platform, and said lever is forked or divided to receive the post $g$, as shown in Fig. 5. A lever $i$ is fulcrumed in a stand $i'$, also on the said platform, and it and the lever $h$ are provided with a number of knife-edges or pins $i^2$, by which they may be connected by link $i^3$ at various points for different multiplications—as, for instance, by hundreds—of the stretch of the test-piece. A lever $j$ is fulcrumed in a stand $j'$ on the platform J and is connected at its short arm by a link $j^2$ with the free end of the lever $i$. The levers $h$ $i$ $j$ constitute the elastic curve set, and they are counterbalanced partly by the lever $k$ and counterpoise $k'$, supported on the stand $k^2$ on the platform J. The lever $j$ is connected with the lever $k$ by means of the connecting-bar $k^3$. From the connecting-bar $k^3$ depends the rod, tape, or other connection $j^3$, which carries the pen-piece or marker $j^4$, and hence the counterweighted-lever $k$ serves to give parallel motion to the said pen-piece.

In addition to the elastic curve set of levers already described there is a lever $l$, fulcrumed in the stand $l'$ on the platform J and having a cord, rod, or other connection $l^2$, which carries the pen-piece or marker $l^3$. These pen-pieces $j^4$ and $l^3$ are guided by rods $j^5$ and $l^5$, which are supported in a bracket $m'$, presently described.

The pen-pieces are both alike, and I have shown only one of them in detail in Fig. 11. Each consists of a glass tube $j^6$, adapted to receive the marking agent and secured in an arm or hanger $j^7$, suspended from a carrier or traveling block $j^8$, which is arranged upon the guide-rods $j^5$. The pen-piece therefore acts by gravity to retain its place on the card on the recording-drum hereinafter described. The lever $l$ is connected by a cord or other device $l^6$ with an arm $l^7$, attached to the rod $e$, (see Fig. 5,) and the office of said lever $l$ is to give the full-test curve.

The stand $l'$, as shown in Figs. 1 and 2, is adjustable, in order to vary (as by hundreds) the multiplications permissible within the range of lever $l$, and to this end the lever $l$ is provided with three, more or less, sets of knife-edges 1 2 3 at different points between the ends of the said lever, it being understood that the ends of said lever vibrate in fixed arcs with relation to the other parts. The stand $l'$ is adapted to be placed in any one of the holes 4 5 6, made in the platform J opposite the knife-edges 1 2 3, and to be secured in such adjustment by a butterfly or other nut or equivalent fastening device 7. Instead of holes a slot may be used. Instead of this arrangement for adjusting the stand to change the fulcrum of the lever I may use others—such, for example, as the modification shown in Fig. 1$^a$, where a bracket 8 is secured to the platform J and the stand $l'$ is adapted to be slid along it and to be held in adjusted position by a binding-screw 9.

The drum is arranged to rotate on a vertical axis within a bracket $m'$, which is attached to the platform J. The card or record-sheet is applied to this drum in any suitable manner—as, for example, by a longitudinal clamp-bar $m^2$ and spring-catch $m^3$ therefor. (See Fig. 8.) The drum is rotated by a tape or cord $n$, attached at one end to a spring $n'$, made fast to the platform, the tape then passing around a pulley $n^2$ on the drum and then over a pulley $n^3$ in an extension of the beam-stand G and applied at the other end to the beam H through a spring-clip or other device $n^4$. Instead of this construction the tape $n$ may end at pulley $n^2$, and a second tape $o$, Fig. 2, may be employed and be connected to a pulley on the drum and pass thence over a pulley $o'$ and be supplied with the weight $o^2$ or be connected with the spring $n'$. In either case the slightest movement of the beam will produce an equivalent motion of the drum. A screw $m^4$, arranged in a stand $m^5$, may be employed to suspend the drum and permit the desired freedom of motion in its bearings. A further modification of the drum-motion consists, as shown in Fig. 4, of a band $p$, arranged on a pulley on the drum and on a pulley $p'$, suspended from the platform J on a shaft $p^2$. On said shaft $p^2$ is another pulley, (not shown,) from which a band $p^3$ extends to a pulley $p^4$, connected with the poise traversing mechanism shown in said figure and illustrated in Patent No. 368,514, dated August 16, 1887. For convenience of operating this mechanism I prefer to put the hand-wheel $p^5$ on a shaft carrying a pinion $p^7$, which meshes with a pinion $p^8$, which in turn meshes with a pinion on the shaft of the pulley $p^4$.

A spring $r$ is connected to the free end of beam H in connection with the use of the drum-rotating mechanism shown in Figs. 1 and 2, and this spring is connected by an adjusting-screw $r'$ to the floor or other fixture. This spring is calibrated so that the capacity of the machine or any particular fraction of it shall allow of a certain fixed amount of revolution of the drum.

In using high multiplications the adjustment by means of the post $g$ enables the operator to extend the length of the diagram by bringing the pen-piece back to the base-line whenever it approaches the top of the card. Thus there may be inscribed upon the card a number or succession of curves to complete the test, and afterward the card may be divided crosswise and the series of curves arranged end for end to make a single long curve showing the full test.

The post or sleeve $g$ has at its top the screw $g'$, and this screw is provided with a graduated rim. The arm $g^2$ is fixed to the sleeve $g$ and relatively immovable, and it is graduated vertically—that is to say, the lines are horizontal. Now if the screw $g'$ is cut with forty threads to the inch and the arm $g^2$ is lined with forty lines to the inch, then each line represents one revolution of the screw, and also the vertical movement of the same.

By dividing the rim of the head of the screw $g'$ into two hundred and fifty equal parts, each part being one two-hundred-and-fiftieth part of a fortieth of an inch, we get an exact ten-thousandth of an inch and can regulate the height of the rod $e$.

In charting the stretch of ductile material at high multiplications the pencil $j^4$ may descend from the top to the bottom of the paper spread on the drum $m$ before the elastic is reached. Then by stopping the machine and turning the screw $g'$ the pencil is raised to the top of the paper in a vertical line and the apparatus is ready to continue the test, and a fresh portion of the curve is charted. By noting the reading of the screw-rim head and post $g'$ and arm $g^2$ one may know the exact amount of vertical given to the sleeve $g$, and the curve of stretch can be accurately determined as a whole and appears in sections on the chart, thus allowing the use of a moderate and practicable sized piece of paper on the drum.

Instead of arranging the levers compactly, as shown, they may be arranged tandem, and instead of being parallel with the beam they may be arranged otherwise—as, for example, at right angles thereto. Other departures than those set forth may be made within the principle of my invention as herein set forth and claimed.

For convenience of reference I herein refer to the levers $h$, $i$, and $j$ and also to the levers $h, i, j$, and $l$ as the "record-transmitter," and for a like reason I designate the drum and its pen-pieces by the comprehensive term the "record-receiver." It will be observed, therefore, that it is within my invention to use either or both sets of levers as a record-transmitter.

The elastic curve set of levers, or, in other words, the "sensitive-lever system," as it is termed in the art, is stopped as follows: It will be premised as understood that the motions of the levers are made by a downward movement of the rod $e$—not a pull, but because the weight of the lever is held up by the rod. Now as the rod $e$ descends the sleeve $g$ descends with it. When the elastic limit is passed, the rod $e$ continues to descend, and when the sleeve $g$ rests on the frame $J$ it stands there, while the rod $e$ still further descends, as the test-piece yields until such rod escapes from the sleeve. When the sleeve $g$ rests upon the frame $J$, there is no further motion possible in the sensitive-lever system.

In illustration of the capabilities or functions of my apparatus I may say that the total elongation in a test-piece is only about .0001 of an inch to .00015 of an inch per inch up to the elastic limit. This infinitesimal elongation it is desirable to determine accurately, and in a diagram apparatus it is preferable to show it exaggerated. To accomplish this for the whole curve would require a very large diagram-sheet in my apparatus, where the stretch is multiplied five hundred times, because in an eight-inch specimen there would be .00015 of an inch stretch at the elastic limit, and by the time the specimen stretches out and breaks it would elongate about 2.5 inches. Hence $2.5 \text{ inches} \times 500 = 1{,}250$ inches or over one hundred feet. These figures refer to mild steels. High steels, cast-iron, cements, &c., have a very much less stretch, so that so far as results are concerned I have been obliged to consider it zero, although I know that there is a deformation before breaking. No chart or diagram heretofore used, so far as I am aware, will show it, but my apparatus does. By my invention it is possible to multiply the stretch in varying ratios according to the material being tested. By using the five-hundred-times multiplier even on the most ductile materials I can keep within the limits of an ordinary diagram-sheet—say eight by fifteen inches—to beyond the elastic limit.

For charting the whole curve the provision of the movable fulcrum enables one to multiply the stretch slightly—say two, three, or more times, according to the material. Heretofore, so far as I am aware, only a single pencil or marker has been used and no provision has been made for varying the chart or diagram according to the nature of the material being tested. In my invention it is possible to multiply and chart the very small elongation which occurs up to the elastic limit and to measure it on the chart. Moreover, it is possible to multiply and chart the elongation of the whole test, and also to chart it without multiplication, as may be desired. In other apparatus, so far as my knowledge extends, it is not possible to depend upon measuring the elongation on the chart, because it is so small that the pencil-line is greater than the total stretch below the elastic limit.

What I claim is—

1. A strain diagram attachment for testing machines, comprising a set of levers for ascertaining the test within the elastic limit, combined with means for connecting said set of levers with the test-piece, and an adjusting mechanism for resetting the pencil to the base line after it has traversed the width of the card and during the operation of the machine, whereby a succession of curves of the width or height of the card is obtained which when placed end to end give the full curve, substantially as described.

2. A strain diagram attachment for testing machines, comprising a set of levers for ascertaining the test within the elastic limit, combined with another lever for ascertaining the full test, and means for connecting them with the test-piece, and thereby causing them to operate simultaneously, substantially as described.

3. In a strain diagram attachment for testing machines, the combination of levers $h$ and $i$, a variable connection for the same, a post arranged in connection with one of such levers, clamps for connection with the test-piece, a connector between said post and clamps, a record-transmitting lever, such as lever $j$, connected with and moved by the first-named levers, and a record-receiving medium, substantially as described.

4. In a strain diagram attachment for testing machines, the combination of levers $h$ and $i$, a variable connection for the same, a post arranged in connection with one of such levers, clamps for connection with the test-piece, a connector between said post and clamps, means to vary the adjustment of the said connector, a record-transmitting lever, such as lever $j$, connected with and moved by the first-named levers, and a record-receiving medium, substantially as described.

5. In a strain diagram attachment for testing machines, a set of levers for ascertaining the test within the elastic limit, having a number of knife edges arranged at different points between its ends, combined with a link connecting the adjacent levers of the set of levers containing such knife edges and movable from one knife edge to another for varying the multiplying capacity of the set of levers, substantially as described.

6. In a strain diagram attachment for testing machines, the record transmitter, record-receiver, and means for connecting the record-transmitter with the test-piece, combined with the beam of the testing machine, means for transmitting the movement of the beam to the record-receiver and a spring applied to the beam, substantially as described.

7. In a strain diagram attachment for testing machines, the combination of the record-transmitter and record-receiver, and a separate lever and weight constituting a counterbalancing device for such record-transmitter, substantially as described.

8. In a strain diagram attachment for testing machines, the lever for obtaining the full test curve having a number of knife-edges arranged at different points between its ends, combined with an adjustable fulcrum stand, substantially as described.

9. In a strain diagram attachment for testing machines, the combination with a record-transmitter and a record-receiver, of upper and lower clamps for engaging the test-piece, a rod upon which they are pivoted, a rod connected with the lower clamp and another rod connected with the record-transmitter and attached to the lower clamp rod at a point distant from such clamp equal to the distance between the clamps upon their pivot rod, substantially as described.

In testimony whereof I have hereunto set my hand this 15th day of March, A. D. 1893.

THOMAS GRAY.

Witnesses:
WM. L. AMES,
CHAS. E. MENDENHALL.